United States Patent [19]

Sakai

[11] Patent Number: 4,839,544
[45] Date of Patent: Jun. 13, 1989

[54] APPARATUS FOR DRIVING A CURTAIN

[75] Inventor: Masanori Sakai, Nagano, Japan

[73] Assignee: Johnan Seisakusho Co., Ltd., Ueda, Japan

[21] Appl. No.: 164,227

[22] Filed: Mar. 4, 1988

[30] Foreign Application Priority Data

Mar. 6, 1987 [JP] Japan .................................. 62-52303

[51] Int. Cl.$^4$ ......................... H02K 41/00; A47H 5/02
[52] U.S. Cl. ......................................... 310/12; 160/331
[58] Field of Search ............... 310/12, 13, 4; 160/331; 318/135

[56] References Cited

U.S. PATENT DOCUMENTS

| | | | |
|---|---|---|---|
| 4,023,057 | 5/1977 | Meckling | 310/154 |
| 4,315,171 | 2/1982 | Schaeffer | 310/12 |
| 4,623,807 | 11/1987 | Nakamura | 310/12 |
| 4,662,424 | 5/1987 | Büsselman et al. | 160/331 |

FOREIGN PATENT DOCUMENTS 60-98489  7/1985  Japan .

Primary Examiner—Patrick R. Salce
Assistant Examiner—Judson H. Jones
Attorney, Agent, or Firm—Birch, Stewart, Kolasch & Birch

[57] ABSTRACT

A driving apparatus of a curtain includes a field portion disposed in a curtain rail containing a curved portion. The field portion includes a yoke and a magnet group having magnetic poles disposed along the yoke alternately so that adjacent poles are different from each other and which is preferably formed of a flexible rubber magnet. There is provided a movable portion guided on the curtain rail movably and including a core base opposed to the magnet group, a plurality of cores project from the core base toward the magnet group and are integrally formed in the core base and coils are wound on a plurality of cores. Further, a commutator which switches the polarity for the movable portion is provided to form a linear motor and thereby the polarity of a dc power source for energizing the commutator is switched so that the curtain attached, at an end thereof, to the movable portion is moved along the curtain rail in one direction and the opposite direction to open and close the curtain.

2 Claims, 3 Drawing Sheets

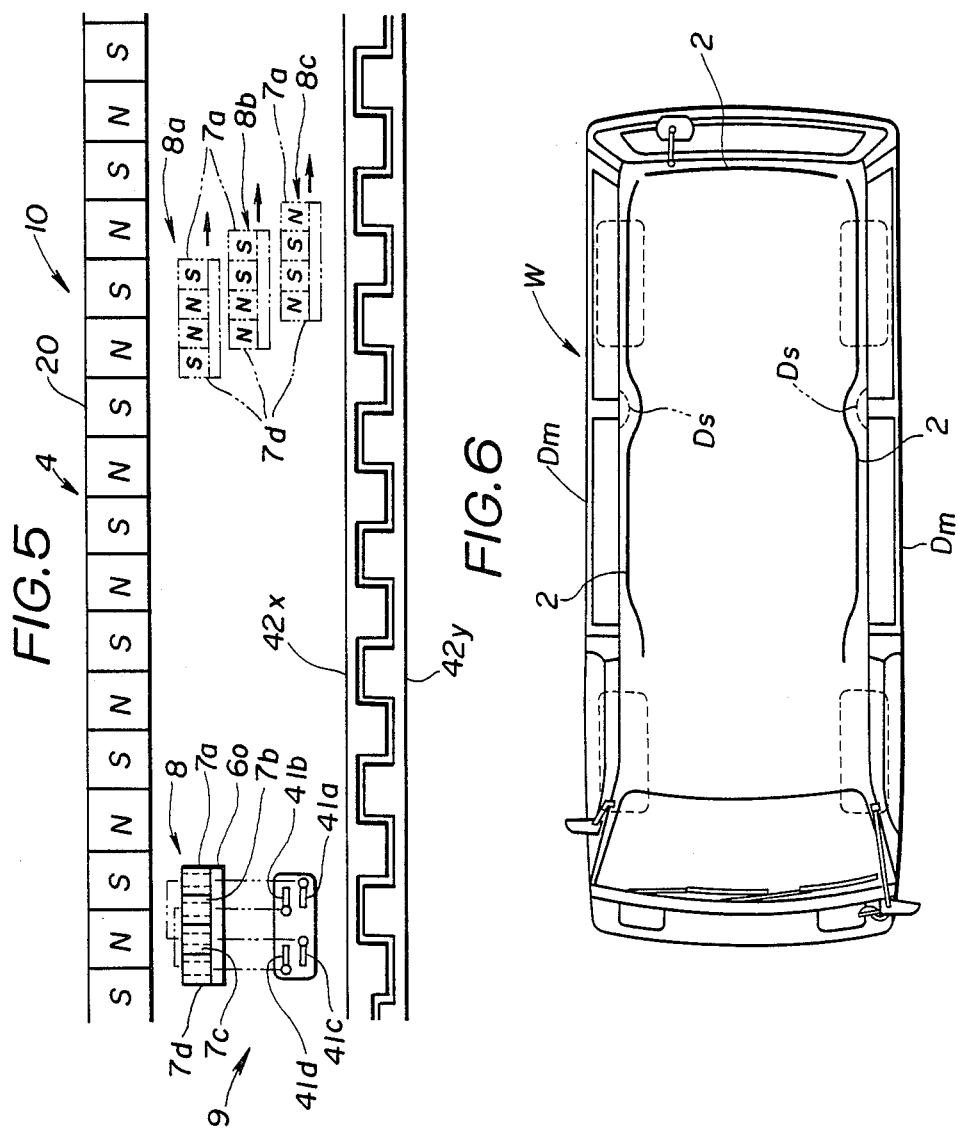

APPARATUS FOR DRIVING A CURTAIN

BACKGROUND OF THE INVENTION

1. Field of the Invention

The present invention relates to a driving apparatus of a curtain using a linear motor and particularly suitable to be installed in a place containing a curved portion.

2. Description of the Relevant Art

Generally, a linear motor has been known as a linearly driving motor and is practically applied to a robot, an X-Y printer and a driving apparatus of a curtain in a small scale field and a railway and the like in a large scale field.

A window of a station wagon as shown in FIG. 6 is fitted with a curtain, while the curtain of this type is usually small and furthermore the installed portion of the curtain is often curved.

Heretofore, a driving apparatus of such a curtain fitted to the window of the automobile is disclosed in, for example, Japanese Utility Model Application Laid-open No. 98489/1985, entitled "An Automatic Opening and Closing Apparatus of a Curtain". The apparatus of the application utilizes a linear motor comprising a housing which forms a curtain rail shaped into a reversed U-letter in section, a magnetic pole portion in the form of a guide rail disposed within the housing in opposite relationship with the housing in the longitudinal direction of the housing to generate uniform magnetic flux in a gap between the housing and the portion, and a movable coil which can be guided by the magnetic pole portion in the form of a guide rail to be moved in the gap perpendicularly to the magnetic flux.

The above conventional apparatus utilizes the force produced when a current flows through the movable coil disposed in the magnetic flux and has an advantage that the movable coil can be thinned relatively, although the apparatus has the following defects.

Firstly, the electromagnetic force acts on only a vertical portion of the movable coil and does not act up any other portions of the coil. Accordingly, most portion of the coil are not useful and in order to obtain the desired electromagnetic force for driving the movable coil must be made correspondingly larger. Consequently, the whole structure of the apparatus is made larger and is not suitable for the curtain of the automobile which requires a small driving apparatus therefor as described above.

Secondly, while there are many curved portions in the installed place of the curtain in the automobile, the movable coil can not follow the curtain rail along the curved portion since the length of the movable coil in the longitudinal direction thereof is long due to the large size of the coil. Accordingly, since the curtain rail must be divided to be disposed in only a straight portion or limited to be disposed in a relatively large curved portion, the design in the installation of the curtain rail and the design of the curtain are extremely limited.

SUMMARY OF THE INVENTION

It is an object of the present invention to provide a driving apparatus of a curtain including a movable portion utilizing a core to generate a magnetic pole so that the movable portion is made very small and which does not require useless space to be able to be provided in an automobile.

It is another object of the present invention to provide a driving apparatus of a curtain including a movable portion having a length in a moving direction thereof which is less than half of that of a conventional movable portion so that the movable portion can be moved smoothly on a curtain rail containing a curved portion of a small curvature and which does not excessively limit the design or the installation of the curtain rail and the design of the curtain and In order to achieve the above objects, according to the present invention, the driving apparatus 1 comprises a linear motor 10 disposed in a curtain rail 2, the linear motor 10 comprising a field portion 5 including a yoke 3 and a magnet group 4 formed of, for example, a flexible rubber magnet which is disposed along the yoke 3 and has magnetic poles disposed alternately so that adjacent poles are different from each other, a movable portoin 8 guided movably on the curtain rail 2 and including a core base 6o opposed to the magnet group 4, a plurality of cores 6a projected from the core base 6o toward the magnet group 4 and integrally formed in the core base 6o and coils 7a wound on the cores 6a and a commutator 9 for switching the polarity for the movable portion 8, whereby an end of a curtain K is attached to the movable portion 8 so that the curtain is opened and closed by movement of the movable portion 8.

With such a structure, the driving apparatus 1 causes the whole of magnetic flux generated by the coils 7a to pass through the cores 6a and a magnetic pole to be produced in the tip of the cores 6a. In this case, the magnetic path is formed through the magnet group, the core, the core base, the core, the magnet group, the yoke and the magnet group (refer to dotted line of FIG. 1).

Further, the magnetic pole of the cores 6a is switched by the commutator 9 at a predetermined position and the movable portion 8 can be moved selectively in one direction or the opposite direction along the curtain rail 2 by inversion of the polarity of the dc power source so that the curtain K attached to the movable portion 8 can be opened and closed.

BRIEF DESCRIPTION OF THE DRAWINGS

FIG. 5 is a evolution diagram illustrating the principle of operation of the driving apparatus; and FIG. 6 is a plan view showing a station wagon to which the driving apparatus is mounted.

DETAILED DESCRIPTION OF THE EMBODIMENT

The structure of a driving apparatus of a curtain according to the present invention is now described with reference to the drawings.

Curtain rails 2 are mounted to, for example as shown in FIG. 6, a rear portion and right and left sides of a station wagon W. The rear curtain rail 2 is gently curved and the side curtain rails 2 are curved slightly inside at the front portion thereof due to central slide doors Dm and are also semicircularly curved inside at the middle thereof due to installation of a duct for an air conditioner. Thus, the curtain rail 2 is formed of a combination of a straight portion and a curved portion, while the driving apparatus 1 of the curtain is suitable for the curtain rail 2 having such a curved portion.

Figure 2:
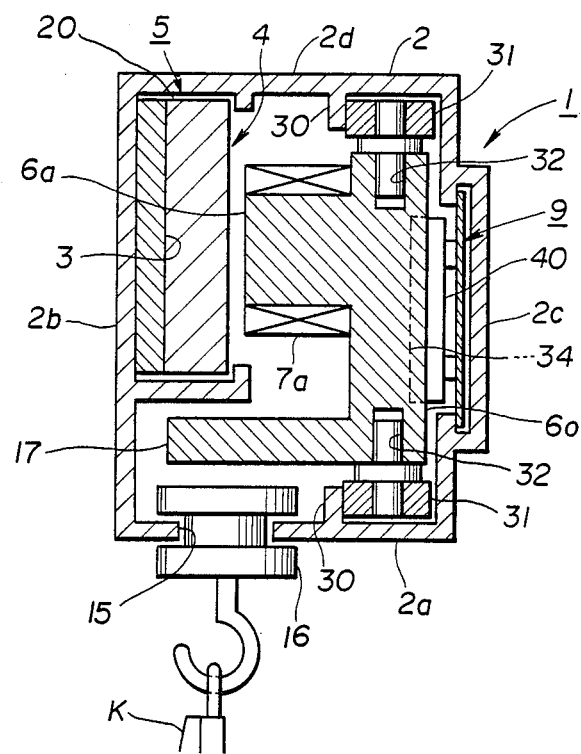
FIG. 2 is a cross-sectional front view of the apparatus of FIG. 1 taken along line A—A of FIG. 1.

The curtain rail 2 is formed into a substantially rectangular shape in section as shown in FIG. 2. A groove-shaped runner rail 15 is formed in a lower side 2a of the curtain rail 2 in the longitudinal direction thereof and a runner 16 which hangs a curtain K is fitted into the runner rail 15. A yoke 3 is attached to the inner surface of one side 2b of the curtain rail 2 along the longitudinal direction thereof and a rubber magnet 20 which is formed of, for example, a ferrite synthetic rubber including magnetic poles which are magnetized alternately so that adjacent poles thereof are different from each other is superposed on the yoke 3 to form a magnet group 4 having the different magnetic poles disposed alternatiely in the longitudinal direction of the curtain rail 2. Thus, the yoke 3 and the curtain rail 2 form a field portion 5. A pair of projecting guide rails 30, 30 are integrally formed in predetermined middle portions on the inside surface of an upper side 2d and the lower side 2a of the curtain rail 2 in the longitudinal direction thereof. Four rollers 31 in total which are provided in upper and lower sides of front and rear portions of a movable portion 8 slide on the guide rails 30, 30.

Figure 1:
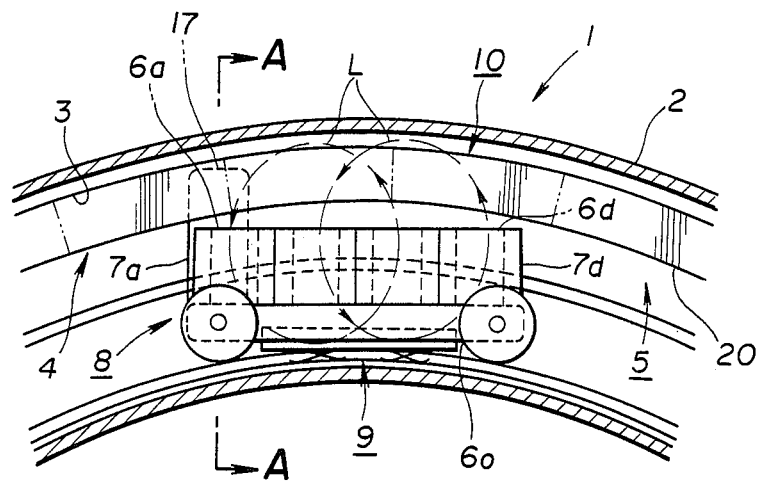
FIG. 1 is a plan view of a driving apparatus of a curtain according to the present invention in which a curtain rail is shown in section.
Figure 3:
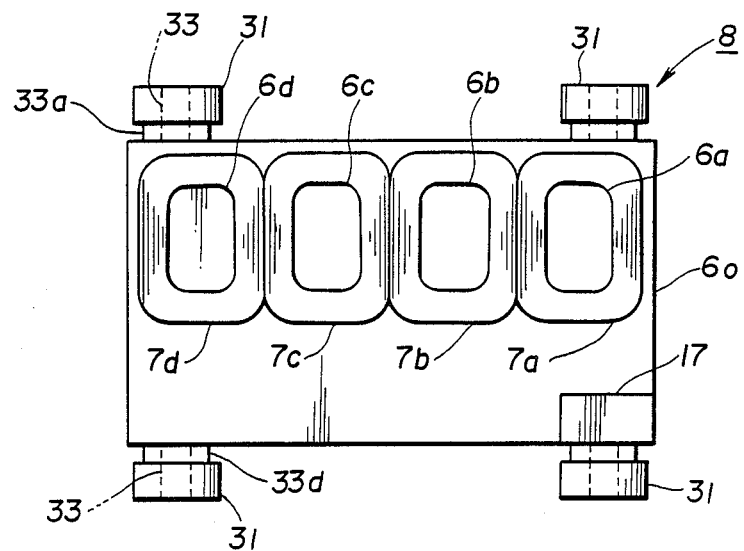
FIG. 3 is a left-hand side view of a movable portion in the driving apparatus.
Figure 4:
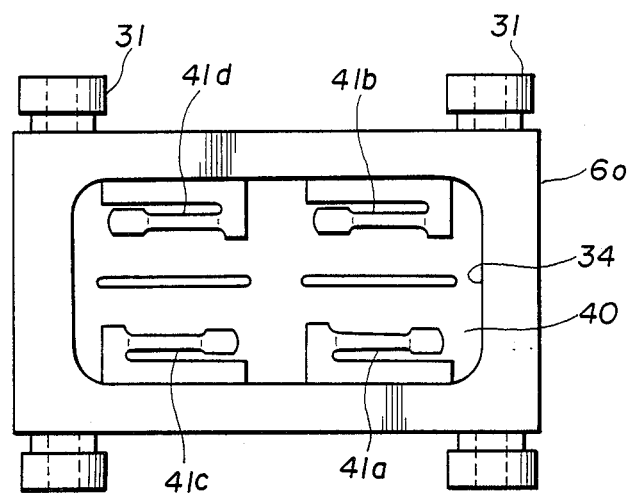
FIG. 4 is a right-hand side view of a movable portion in the driving apparatus.

The movable portion 8 is now described with reference to FIGS. 3 and 4. The movable portion 8 includes a rectangular core base 6o having a predetermined thickness and parallelly opposed to the rubber magnet 20. The core base 6o is provided, at the opposite side thereof to the rubber magnet 20, with four cores 6a, 6b, 6c and 6d which are projected toward the rubber 20 perpendicularly to the core base 6o and are integrally formed at equal intervals in the longitudinal direction. A distance between the centers of the cores disposed alternately is equal to a pitch between the poles magnetized in the rubber magnet 20. A slight space is formed between the cores 6a–6d and the rubber magnet 20. Thus, the magnetic path is formed through the rubber magnet, the core, the core base, the core and the rubber magnet as shown by dotted line L of FIG. 1. Further, the cores 6a, 6b, 6c and 6d are fitted into coils 7a, 7b, 7c and 7d, respectively, which are previously formed into a coiled state. The coils for the cores 6a and 6c are connected in series to each other and the coils for the cores 6b and 6d are connected in series to each other.

Further, bearings 32 are provided in the front and rear portions of the upper and lower sides of the core base 6o vertically. Each of shafts 33, including stoppers 33a integrally formed in the middle thereof, is inserted in each of the bearings 32 and each end of the shafts 33 is rotatably inserted into each of the rollers 31. Thus, the shafts 33 are disposed perpendicularly to the attracting direction of the magnet group and the rollers 31 can slide on the guide rails 30.

A horizontal support arm 17 is integrally formed to a lower end of the core base 6o. One end of the curtain K having the other end fixed to an end of the curtain rail 2 is attached to the support arm 17 so that the curtain K can be opened and closed by movement of the movable portion 8.

The other side of the core base 6o is formed with a recession 34 and a brush holder 40 is fitted into the recession 34. Brushes 41a, 41b, 41c and 41d as shown in FIG. 4 are attached to the brush holder 40. Commutator plates 42x and 42y having a pattern shown in FIG. 5 are attached to the other side 2c of the curtain rail 2 opposed to the brushes 41a–41d which come into contact with the commutator plates 42x and 42y which form a commutator portion 9.

Accordingly, when the commutator plates 42x and 42y are connected to negative and positive dc power sources, respectively, a current flows through the commutator plate, the brush, the coil, the brush and the commutator plate from the power source to excite the coils 7a–7d so that predetermined magnetic poles are produced in the cores 6a–6d. The poles of the cores 6a–6d are switched by the commutator portion 9 in accordance with the position where the movable portion exists.

The principle of operation of the driving apparatus 1 is described. The coils 7a and 7c are connected in series to each other and both ends of the series connection are connected to the brushes 41a and 41c, respectively, while the coils 7b and 7d are connected in series to each other and both ends of the series connection are connected to the brushes 41b and 41d. Consequently, magnetic poles shown in FIG. 5 are produced at each of positions 8a, 8b and 8c of the movable portion 8 shown by fantastic line of FIG. 5 so that the movable portion 8 is always attached to the magnetic poles of the magnet group 4 to be moved in the direction shown by arrow. Further, when the polarity of the commutator plates 42x and 42y is reversed, the movable portion 8 is moved in the opposite direction.

As described above, in the driving apparatus 1 of the curtain according to the present invention, the whole of magnetic flux generated from the coils 7a–7d passes through the cores 6a–6d and the magnetic poles are produced at the end of the cores 6a-6d. Accordingly, the useless portion of the coil is eliminated and the movable portion 8 possesses sufficient driving force even if the portion is small. The width of the movable portion 8 in the longitudinal direction is about 3 cm and can be reduced to about a half as compared with that of a conventional movable coil type. Further, the height thereof can be also reduced to about a half as compared with the conventional height and hence the whole size can be reduced to a quarter or less as compared with the conventional size. Furthermore, since the magnetic efficiency is excellent, the driving apparatus can produce the driving force sufficient to open and close the curtain K provided in the automobile.

While the embodiment has been described in detail, the present invention is not limited to such an embodiment. For example, the magnet group 4 may be formed of a plurality of rigid discrete magnets having a single pole and which are juxtaposed successively. Further, while the four cores are used in the embodiment, any number of cores may be used if necessary. Furthermore, the driving apparatus is provided to hang the curtain K, while a further driving apparatus may be disposed in the lower side of the curtain K to draw both of the upper and lower sides of the curtain K simultaneously. The driving apparatus of the present invention has been described to be used in the automobile, while the driving apparatus can be utilized for other uses as it is. Other detailed structure, shape, arrangement, quantity, material and the like may be changed without departing from the scope and spirit of the invention.

What is claimed is:

1. A driving apparatus of a curtain comprising:

a linear motor disposed in a curtain rail including a curved portion, said linear motor including a field portion having a yoke and a magnet group disposed along said yoke and having magnetic poles disposed alternately so that adjacent poles are differnet from each other;

a movable portion movably guided on said curtain rail and including a core base opposed to said magnet group and having rollers each with a shaft disposed perpendicular to an attraction direction;

a plurality of cores projecting from said core base toward said magnet group and integrally formed in said core base with coils wound on said cores; and a commutator for switching the polarity for said movable portion, whereby an end of a curtain being attached to said movable portion of the curtain is opened and closed by movement of said movable portion.

2. A driving apparatus of a curtain according to claim 1, wherein said magnet group comprises a flexible rubber magnet having alternately magnetized poles so that flexible poles are different from each other.

* * * * *